US006873689B1

(12) United States Patent
Butler et al.

(10) Patent No.: US 6,873,689 B1
(45) Date of Patent: Mar. 29, 2005

(54) VOICE PROCESSING SYSTEM

(75) Inventors: Nicholas David Butler, Romsey (GB); David Seager Renshaw, Winchester (GB); Andrew James Ritchie, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/545,593

(22) Filed: Apr. 7, 2000

(30) Foreign Application Priority Data

Jun. 26, 1999 (GB) .............................................. 9914881

(51) Int. Cl.[7] .......................... H04M 1/64; H04L 12/66
(52) U.S. Cl. ............................... 379/93.05; 379/88.17; 379/900; 370/352
(58) Field of Search ........................... 379/93.05, 93.06, 379/93.09, 220.01, 221.01

(56) References Cited

U.S. PATENT DOCUMENTS

| | | | | |
|---|---|---|---|---|
| 6,069,890 A | * | 5/2000 | White et al. | 370/352 |
| 6,144,724 A | * | 11/2000 | Stovall | 379/93.05 |
| 6,147,988 A | * | 11/2000 | Bartholomew et al. | 370/352 |
| 6,347,085 B2 | * | 2/2002 | Kelly | 370/352 |
| 6,452,922 B1 | * | 9/2002 | Ho | 370/352 |
| 2003/0095542 A1 | * | 5/2003 | Chang et al. | 370/352 |

FOREIGN PATENT DOCUMENTS

| | | | |
|---|---|---|---|
| EP | 0840491 | 5/1998 | H04M/3/50 |
| GB | 2312593 | 10/1997 | H04M/3/50 |
| GB | 2319431 | 5/1998 | H04M/3/50 |
| GB | 2325112 | 11/1998 | H04M/3/50 |
| WO | WO 97/50235 | 12/1997 | H04M/3/50 |

OTHER PUBLICATIONS

VocalTec Telephony Gateway Web Publication, Jan. 27, 1997, see entire document.*
VocalTec Telephony Gateway—Internet Publication, Jan. 27, 1997.*
http://www.computertelephony.org (comprehensive directory of voice processing systems).

* cited by examiner

Primary Examiner—Ahmad F. Matar
Assistant Examiner—Hector Agdeppa
(74) Attorney, Agent, or Firm—Jerry W. Herndon (57) ABSTRACT

A voice processing system is disclosed having a first interface for receiving telephone calls from the Public Switched Telephone Network (PSTN) and application software for processing received PSTN telephone calls. The voice processing system supports an API to allow the first interface to inform the application software of the presence of the call. The voice processing system further has a second interface for receiving telephone calls from an internet protocol (IP) network, and a signaling subsystem for routing an IP call from the second interface to the application software. This signaling subsystem uses the same API as is used to inform the application software about PSTN calls. Therefore, it is transparent to the application software whether an incoming call has been received from the IP network rather than the PSTN.

20 Claims, 10 Drawing Sheets

VOICE PROCESSING SYSTEM

BACKGROUND OF THE INVENTION

1. Field of the Invention

The present invention relates to voice processing systems and more particularly the manner in which such systems interface to data packet networks.

2. Description of the Related Art

Voice Processing systems are well-known in the art (see http://www.computertelephony.org for a comprehensive directory). They provide a computer-based method of non-simultaneous telephone communications and carry out a variety of tasks. These include VoiceMail, whereby callers who cannot reach their intended target can instead record a message for subsequent retrieval, and interactive voice response (IVR) systems, which enable callers to interact with the voice processing system, typically via dual tone multiple frequency (DTMF) keys, to retrieve and update certain information. Conventional IVR applications include amongst others, telephone banking, flight booking enquiries and the placing of home shopping orders.

An example of a voice processing system is the Direct-Talk for AIX voice processing system available from IBM Corporation, and described in the manual "DirectTalk for AIX, General Information and Planning", reference number GC33-1840-00, plus the other manuals referenced therein. Like many modern voice processing systems, the DirectTalk system is based on a general-purpose computer (in this case an RS/6000 workstation) with additional hardware and software for the telephony and voice processing functions. (DirectTalk, AIX, and RS/6000 are trademarks of IBM Corporation).

Traditional Voice Processing systems have been designed to connect to the Public Switched Telephone Network (PSTN) either via an analogue telephone connection, or via digital trunks lines.

One of the major advantages associated with such systems, is that they are capable of handling large volumes of telephone traffic on a continuous 24 hour by 7 day basis. Individual signals are time multiplexed together for transmission over the digital trunks. In North America, the standard form of trunk line is known as T1, and provides 24 simultaneous lines with a data connection speed of 1.544 Mbps. These trunk lines can be used not only to carry the actual audio telephone signal, but also to provide a limited degree of signaling information, for example, to reserve a channel, to make a call on a channel, to transfer a call, and so on. In Europe, the standard form of trunk line is known as E1, and provides 32 simultaneous lines (of which 30 are for telephony channels, one for framing, and one for signaling). E1 lines support a data speed of 2.048 Mbps.

The telephone channels can be processed for IVR functions like DTMF detection, call progress detection, DTMF generation, voice recognition, text to speech and the playing of compressed and uncompressed voice segments or messages.

Typically, a voice processing system incorporates an internal time division multiplex (TDM) bus to coordinate its telephone channels. Each is allocated a timeslot on the bus. The main TDM bus types commercially used in voice processing systems are the PCM Expansion bus (PEB), supporting up to 128 64 kbps TDM timeslots, and the SCbus, supporting up to 2048 64 kbps timeslots, both from Dialogic Corporation. Other well-known TDM buses include, the Enterprise Computer Telephony Forum (ECTF) H.100 CTBus, and also the MVIP bus, defined by the GO-MVIP organization, and available from Natural Microsystems Corporation, which supports up to 512 64 kbps timeslots. These can be used either as part of a chassis backplane or via a ribbon cable between TDM interface cards.

The TDM bus interfaces support 64 k bit per second digital timeslots and both E1 and T1 trunks contain dedicated 64 k bit digital voice/data channels, so interfacing dedicated voice channels which are also 64 k bits per second is mainly a matter of synchronization of the channels from the appropriate telephony interface into the appropriate timeslots on the TDM bus. One timeslot can be used for the transmit direction of one 64 k channel and another for the receive direction.

It is also possible to interface voice processing systems to other lines (rather than just digital trunks), for example analogue voice channels, which can be sampled by Analogue to Digital (A to D) convertors into a 64 k bit voice/data channel or in the opposite direction using D to A convertors. Other transmission mediums which deliver dedicated 64 k bit per second channels using their transport mechanisms like Asynchronous Transfer Mode (ATM) could also be interfaced to voice processing systems. All these dedicated mediums are known as Isochronous since they provide a guaranteed data rate on the channel.

There has been much interest in the transmission of voice channels on data transmission networks which use protocols like TCPIP packet transmission instead of dedicated isochronous channels. There are advantages of voice over data (packet) networks in that interface costs to the network are lower and many computer users already have data connections. It also means that local work groups which use Local Area Networks (LANs) for data communication can re-use these for voice communication and possibly combined voice/data multimedia communication in realtime, but this is very much dependent on how busy the network is.

Some voice processing systems can already use one single interface for both voice and data, but this tends to be via a dedicated isochronous telephony channel like an analogue telephone channel or basic rate Integrated Services Digital Network (ISDN).

The disadvantage of voice over data packet networks is that there is no guarantee of exactly when any specific data packet may reach its destination. If there are multiple routes between the source and destination the packets may also be received out of order. For data this is easily resolved by queuing the packets up in the correct order and at some later time storing it or retransmitting it to another party. Realtime consistent data flow in which under run or overrun conditions matter is not a concern for data, but most certainly is for voice. Voice data received and played to someone out of order, would make speech unintelligible. Delays between playing out the first and second parts of a sentence are also unacceptable since this would be inconvenient to the user, and may change the context of the sentence for the listener.

A lot of work has gone on to resolve these issues and standards have been defined like the International Telephony Union (ITU) T Recommendations, H.323 on Visual Telephone systems and Equipment for LANs that do not guarantee quality of service. Within this recommendation there are references to other specifications and recommendations like data packet synchronization H.225, H.245 signaling control, H.261 and H.263 video codecs and G.711, G.722, G.728, G.729 and G.723 audio codecs.

Using these recommendations products are being developed to interface voice devices to data-packet networks (eg the Internet). One such device is an IP phone, which provides users with real-time, full-duplex communication over the Internet. The device is typically a home personal computer (PC) running application software which simulates the telephony environment. For example, the FreeTel Corporation market such software and it is possible to download a trial version from their web-site, http://www.freetel.inter.net. A graphical numeric keypad enables the user to dial another IP phone, connecting to the data-packet network via a dial-up Point-to-Point Protocol (PPP) or Serial Line Internet Protocol (SLIP) Internet connection. Voice data is initially input through a microphone, attached to the PC and is transmitted, via the machine's Internet connection, across the network to the other phone. The voice data can be heard through a headset which is also attached to the PC.

It is also important that telephone calls can be made from IP phones to PSTN phones. Gateway devices are being developed, which take IP data and stream it into 64 k bit per second isochronous format. Such devices also allow the data to be interfaced to E1 and T1 lines, and to Analogue channels, via D to A convertors. The streaming functions do two things:

i) Take voice from a 64 k bit per second channel via an Audio Codec,packetize and send to the IP phone;
ii) Take packetized voice, enqueue it until it has a certain length, thus guaranteeing a certain period of constant voice, and then stream this to an audio codec to play into a 64 k bit per second channel.

This allows a telephone call to be made from an IP phone to an ISDN or analogue telephone connected to the PSTN. The gateway can also allow incoming calls from a normal telephone to an IP phone. The routing of such calls is done by a process called a Gatekeeper as specified in the H.323 standard. Additionally, a gateway should also be able to synchronize to TDM buses of the types previously discussed.

The advantages of transmitting voice channels on data-packet networks such as the Internet have already been discussed. For these same reasons, it is extremely beneficial for voice processing systems to interface directly to data-packet networks rather than have to accept IP phone calls which have first had to be routed via the PSTN. Although such a setup is known, existing IP solutions appear to require a new IP interface card which has all the voice processing resource on board to handle all incoming calls. Some cards may also have both the IP interface and the PSTN interface encapsulated within them. The whole process is therefore contained within the one card.

Therefore the approach thus far has been to design a new adapter with a data connection interface which handles all of the H.323 recommendations, including voice transport, signaling, does all the voice processing on board and interfaces to the IVR applications. Specific voice processing algorithms like voice compression/decompression, silence detection, DTMF generation/detection are also typically included. Two examples of this are:

i) The Dialogic Corporation (See http://www.dialogic.com) has an IP only card, DM3 IPLink Release 2, with Ethernet and Quad E1/T1 interface on board. However, it is really designed as an IP gateway solution to act as a bridge between the PSTN and an IP network. The software APIs to drive the card differ from those used to process normal PSTN only calls.
ii) The Linkon Corporation (See http://www.linkon.com) supplies an IP card solution, LinkNet. This acts as an IP switch and also provides an enhanced services platform. Those services supported include amongst others, fax, interactive voice response, and speech recognition. LinkNet also facilitates the transmission of both voice and fax over IP, using an IVR front-end, and also supports a wide variety of signaling and call control functions. All this is achieved via the one single platform. This solutions permits dynamic switching between the available call routes. In other words: Internet; or Intranet; or PSTN.

However, such solutions tend to incorporate new software Application Programming Interfaces (APIs) to drive the software solution. Thus previously purchased existing hardware cards become redundant should the customer wish to move from a voice processing system connected directly to the PSTN to an IP connection instead. This means applications written for a voice processing system which is PSTN connected won't work when IP connected unless they have some modifications applied.

SUMMARY OF THE INVENTION

Accordingly the invention provides a voice processing system comprising:
  a first interface for receiving telephone calls from the Public Switched Telephone Network (PSTN);
  application software for processing received PSTN telephone calls;
  a second interface for receiving telephone calls from an internet protocol (IP) network; and
  a signaling subsystem for routing an IP call from the second interface to the application software, such that it is transparent to the application software that said call has been received from the IP network rather than the PSTN.

Therefore the same application can be used to process both IP calls and PSTN calls (either in the same or in different machines), thereby increasing flexibility, and reducing costs for application development and maintenance.

In the preferred embodiment, the first and second interfaces are both connected to a TDM bus, and said second interface comprises: means for routing the audio data element of a IP call over the TDM bus to the first interface; and means for routing the signaling element of said IP call to the signaling subsystem. The second interface further comprises means for converting the IP audio data received from the IP network into TDM format for transmission across the TDM bus (and vice versa for data transmitted from the voice processing system out onto the IP network).

It will be appreciated that sending the audio data over the TDM bus is in fact something of an indirect route into the voice processing system, since the application could in principle obtain the voice data directly from the second interface. However, this would require existing applications, which are not aware of the interface to the IP network, to be re-written. By contrast, transmitting the audio data from the second interface, over the TDM bus, to the first interface, results in all audio data effectively terminating at the same location, irrespective of origin. Again this renders the source of the call (IP or PSTN) transparent to the application.

One subtlety here is that there is some variation in the handling of signaling components between IP and PSTN telephone calls. Therefore, the second interface preferably includes means for converting certain signaling elements such as DTMF calls from said IP call into audio data for transmission to the first interface over the TDM bus, so that again the application cannot distinguish between inbound data from a PSTN call, and inbound data from an ISDN call.

In the preferred embodiment, the signaling subsystem comprises one or more signaling processes, which all communicate with the application software via the same signaling interface. Typically such interface supports both various forms of PSTN signaling, such as ISDN and SS7, and also H.323 signaling for IP calls. In this manner the same interface is used for both PSTN and IP calls, such that the network from which a call originated is transparent to the application (in other words, an application can support calls from both networks).

One aspect of this is that the H.323 signaling process typically includes means for mapping the channel upon which the IP call is placed into a corresponding voice processing system trunk and channel, thereby simulating the effect of a call from the PSTN, even though the trunk number has no direct meaning for an IP call.

In the preferred embodiment, the IP network is the Internet, but the invention is applicable to calls from any Internet Protocol (IP) or H.323 supporting network (such as company intranets, extranets, and so on).

The invention further provides a method for operating a voice processing system including a first interface for receiving telephone calls from the Public Switched Telephone Network (PSTN) and application software for processing received PSTN telephone calls; said method comprising the steps of:

receiving at a second interface an IP telephone call from an internet protocol (IP) network; and routing the IP call from the second interface to the application software, such that it is transparent to the application software that said call has been received from the IP network rather than the PSTN.

The invention further provides a line adapter card for use in a voice processing system, said adapter card supporting a plurality of trunks/channels and having:

a first interface for receiving telephone calls from the Public Switched Telephone Network (PSTN);

a second interface to a TDM bus in the voice processing system;

and means for configuring the adapter card to simultaneously support incoming calls from both: (i) the PSTN via the first interface; and (ii) an IP network via the second interface;

wherein selected trunks/channels of the adapter are allocated to the first interface, and other selected trunks/channels of the adapter are allocated to the second interface.

Thus the above approach allows the re-use of standard interfaces for telephony application calls from both the PSTN and an IP network, and also to re-use the same voice processing resources for either normal PSTN or IP operation. Consequently, applications which run over the PSTN can also run unmodified over IP, and so support calls from either or both networks.

In the preferred embodiment, an IP data connection interface and system supports H.323 recommendations, but accesses the standard IVR interface E1, T1 and analogue interface cards to do the voice processing via their TDM connection bus interface. The H.323 signaling is also interfaced to the standard signaling interface of the existing IVR. The result is that the IVR application can be re-used for IP telephony unchanged from the analogue or E1/T1 telephony.

This approach is of great benefit to the customers of companies which provide voice processing solutions, especially if those customers have already invested a great deal of money and effort in writing applications specific to a PSTN connection. With such a solution their applications will still work even though the voice network source may differ. Such customers can deploy a single application for all calls, irrespective of origin, thereby reducing application development and maintenance costs. By re-using existing hardware components, customers can switch a system (or part of a system) between IP connection and PSTN connection, thereby maximizing flexibility. For example, if the timings of the peak rates for IP and PSTN calls differ, then a machine can be dynamically configured to best match these real-time rates. Likewise, there is no obligation on the customer to favor or predict the frequency of one mode of call in comparison with another. Thus this reuse of existing IVR hardware adapters and applications is clearly very beneficial to IVR customers. Another advantage is that this approach also limits the complexity required in the adapter and the software required to interface to the data network for voice processing, compared to prior art devices.

BRIEF DESCRIPTION OF THE DRAWINGS

A preferred embodiment of the invention will now be described in detail by way of example only with reference to the following drawings. Corresponding components will be identically numbered throughout the figures:

FIG. 1b is a block diagram illustrating the main software componentry running on the voice processing system of figure 1a.

FIG. 3b illustrates the processing of an inbound IP call to the voice processing system according to the configuration of FIG. 3a.

DETAILED DESCRIPTION

Figure 1A:
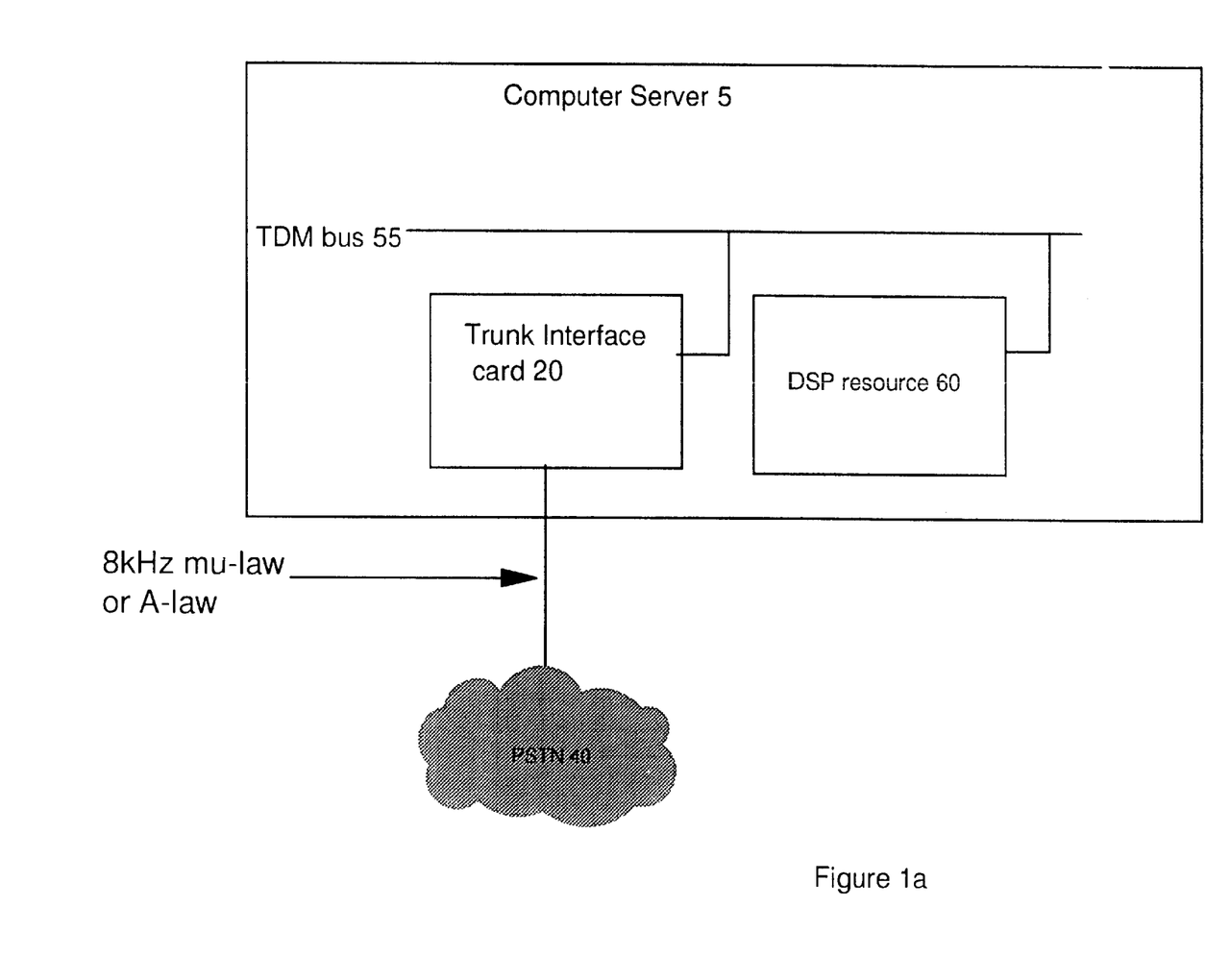
FIG. 1a is a schematic diagram of the hardware arrangement in a voice processing system.
Figure 1B:
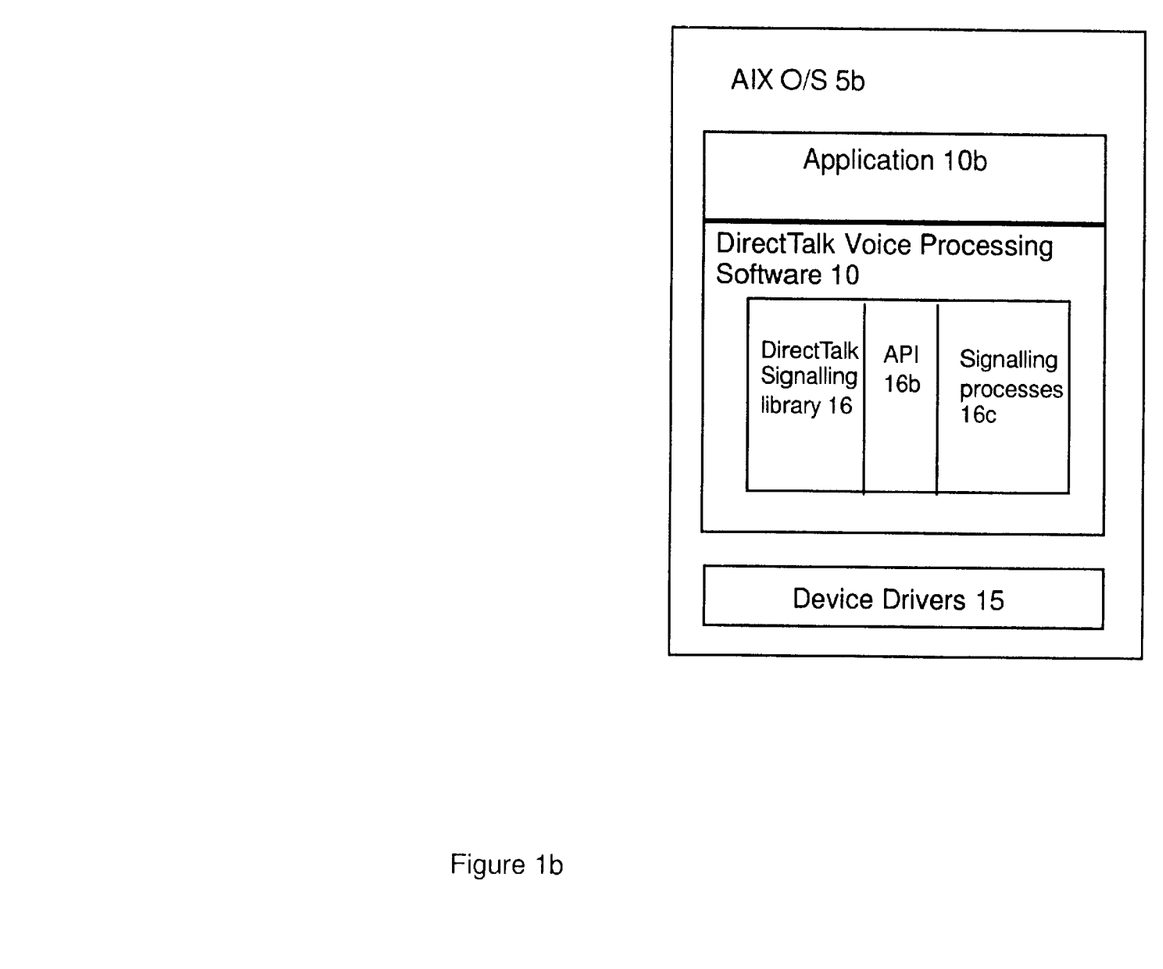

FIG. 1a illustrates the arrangement of the hardware in a voice processing system (refer to FIG. 1b for the software configuration). The system is a computer server 5 comprising a CPU, RAM/ROM, PCI bus and other known features (not shown). The server includes a trunk interface card 20 (TIC) which coordinates the system's connection to the PSTN 40. In the preferred embodiment the computer server is an RS/6000 workstation running in conjunction with the TIC which is a Digital Trunk EXtended Adapter card (DTXA), both available from the IBM Corporation. The TIC is linked via a TDM bus 55 to one or more DSP cards (one shown 60), plugged into a PCI bus (not shown), which can provide functions such as voice recognition and text to speech generation. In the preferred embodiment, the TIC interfaces to the PSTN, optionally through a switch or PBX, via a plurality of T1/E1 lines (for example a single DTXA may terminate four E1/T1 trunks), which provide digital audio signals according to 8 kHz mu-law or A-law respectively.

FIG. 1*b* is a block diagram illustrating the main software componentry running on the voice processing system of FIG. 1*a*. Running on the server is the operating system 5*b* and on top of that the voice processing software 10. In the present case, the operating system is AIX and the voice processing software DirectTalk for AIX, both available from the IBM Corporation. On top of the voice processing software run one or more applications 10*b* (one shown) which might for example play a particular set of menu options, allow retrieval of certain information etc. Each time a call is processed (inbound or outbound), a new instance of the relevant application is launched. Note that in the preferred embodiment, the association of application with a particular call can be dependent on the physical trunk/channel associated with that call, or on various "soft" parameters (eg calling and/or called number, time of day, etc). Application profiles (not shown) are created to designate the application which applies to a particular incoming call. Finally, there are number of device drivers 15, which are used to coordinate the system's interaction with the TIC (see FIG. 1*a*) and other cards.

As part of the voice processing software there exists a signaling library 16 which provides support for a number of signaling processes 16*c*. These are responsible for informing the voice processing software as to the state of the telephony channels. Thus when an incoming call is detected it is one of these processes that relays this information to the voice processing software 10 etc. Communication between this library and the signaling processes takes place via a signaling application programming interface (API) 16*b*. This API also permits the signaling processes to communicate with the voice processing software.

The type of signaling process used depends on the manner of connection to the PSTN. For example, a T1 trunk can have channel associated signaling (CAS), in which the signaling is effectively contained within the audio channels via robbed bits, or common channel signaling (CCS), in which the signaling information is contained in a separate channel from the audio channels. Two examples of signaling protocols used for CCS connections to the PSTN are SS7 and ISDN. An embodiment will now be described which uses ISDN as the signaling protocol, but it will be appreciated that the invention is not limited to any particular such protocol or signaling format.

Figure 2A:
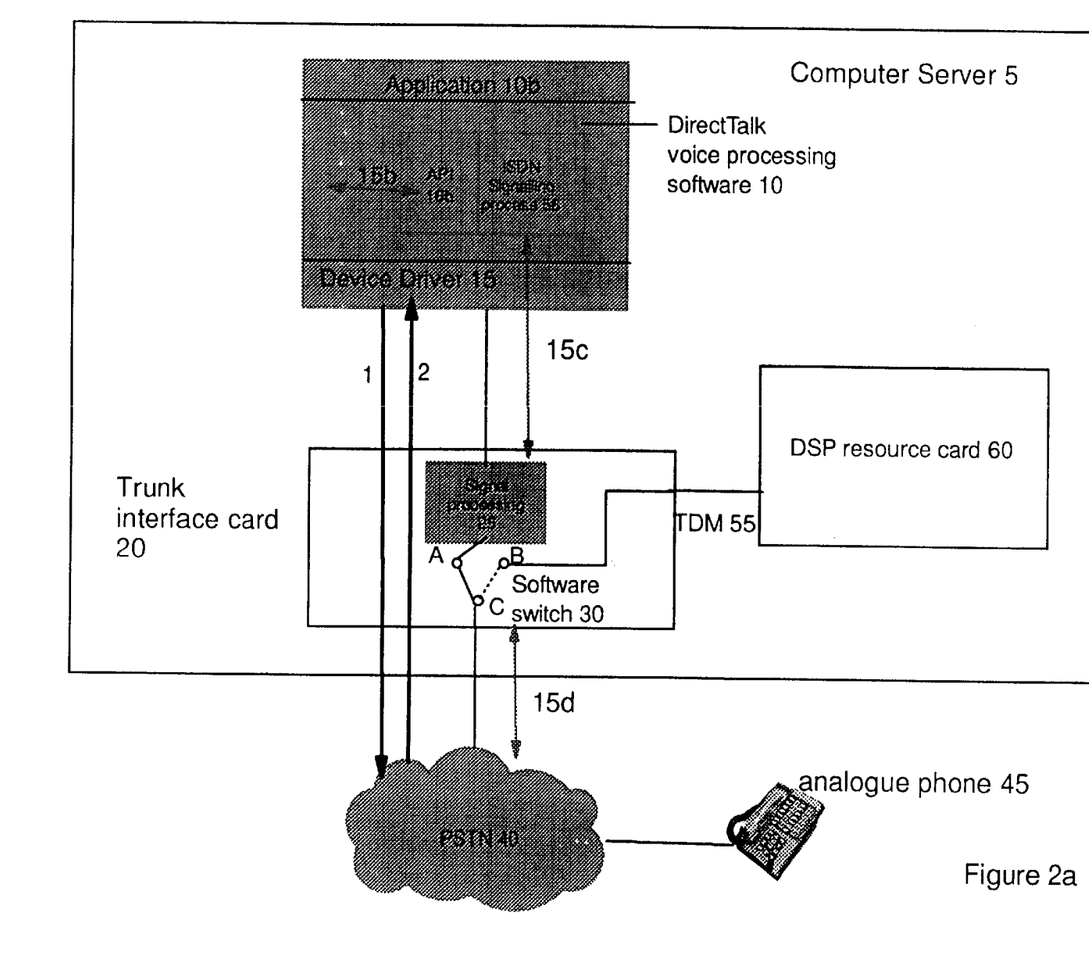
FIG. 2a is a schematic diagram of communication between a standard analogue phone attached to the PSTN and the voice response system's voice processing software, according to the prior art.

FIG. 2*a* illustrates the communication between a standard analogue phone 45 attached to the PSTN 40, the DirectTalk voice processing software 10 and ultimately an application lob running on top of this. The software 10 communicates with the TIC (DTXA) 20 via the appropriate device driver 15. The DTXA includes a digital signal processing (DSP) resource 25, below which sits a conceptual software switch 30. The voice processing software sets this switch via the device driver.

Communication can take place in both directions between the PSTN and the voice processing software (arrows 1 and 2) via the A to C connection. This enables an analogue phone 45 to interact under the control of the application software with the signal processing resource 25 as necessary, in order to play prompts, perform DTMF recognition and so on. This switch setting (ie A to C) is the default configuration. The B to C software switch setting permits communication with other DSP resources (one shown 60) via the TDM bus 55. Such a resource might, for example, contain voice recognition software or process data using a fax card.

It will be appreciated that with a receive channel (ie incoming audio to the voice processing system) it is possible for both switch settings to be effective (ie A to C and B to C). This allows multiple devices to listen to the same incoming stream (perhaps to record and to perform voice recognition). However, for the transmit channel, only A to C or B to C can be effective, since there is no mechanism in the switch to add together audio sources from different channels.

Telephony signals are sent from the PSTN, up through the DTXA card, to the relevant signaling process (one shown 56) and the reverse is also possible 15*c*, 15*d*. In the embodiment of FIG. 2*a*, an ISDN signaling process is employed. The DirectTalk voice processing software communicates with this process via the signaling API 16*b* (arrow 15*b*).

Figure 2B:
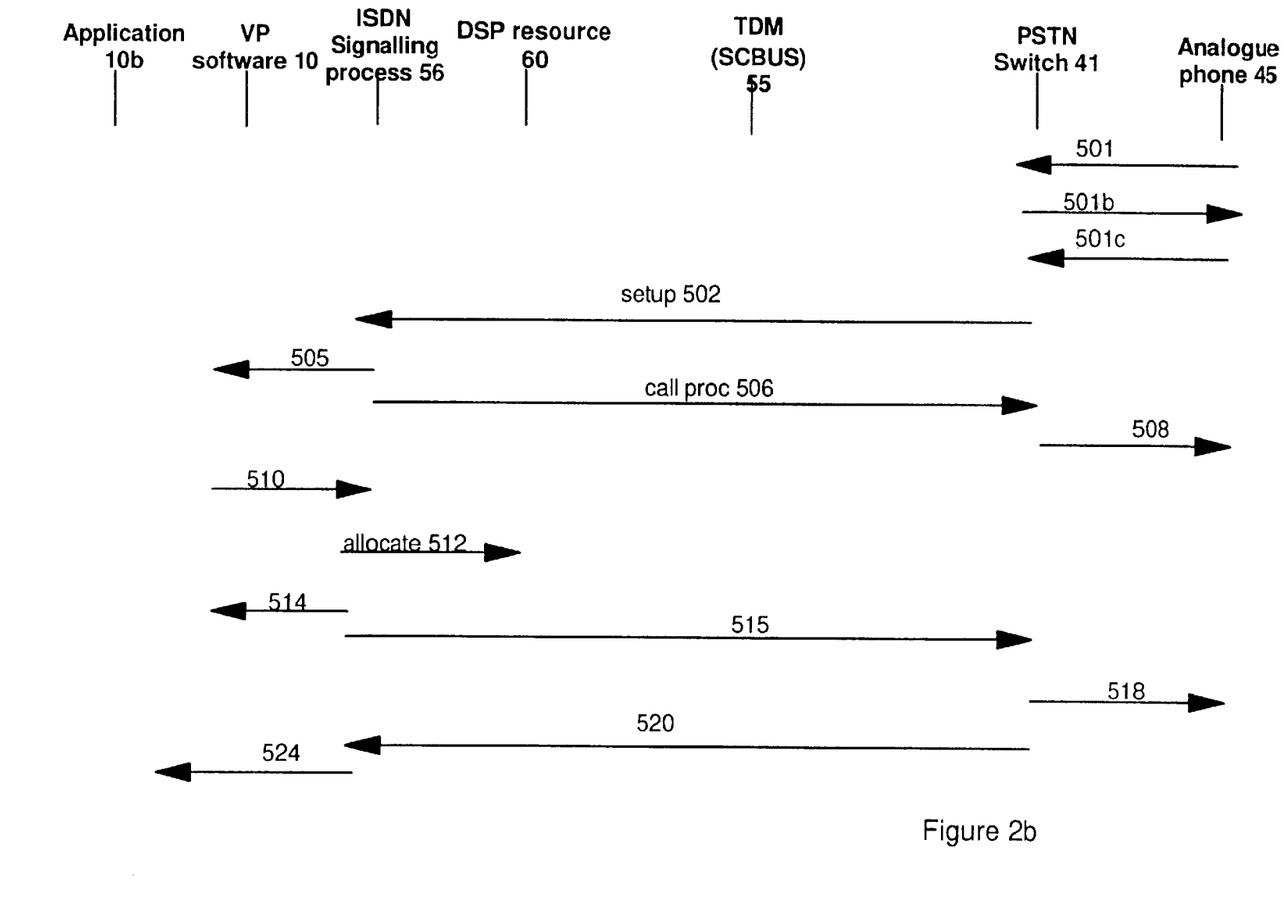
FIG. 2b illustrates the processing of a conventional inbound PSTN call.

FIG. 2*b* illustrates the processing of a conventional inbound PSTN call. An analogue phone 45 makes a telephone call over the PSTN 40 (see FIG. 2*a*) to the voice processing system. According to the preferred embodiment, the phone initiates the call by sending an offhook signal to the PSTN switch 41 (arrow 501) and the switch responds with a dial tone 501*b*. The analogue phone 45 then dials the number of the voice processing system and this is sent to the PSTN switch (arrow 501*c*) which transmits a setup request to an ISDN signaling process 56, within the voice processing system 10, in order to inform it that there is an incoming call (arrow 502). The ISDN signaling process makes the voice processing software 10 aware of the call (505) and then informs the PSTN switch that the call is proceeding 506. The switch relays this information to the phone (arrow 508) by transmitting a ringing tone and at the same time the voice processing software tells the ISDN signaling process that it should allocate some DSP resource (510), which it does at 512. This allocation is done to ensure there is a working resource which can handle basic voice processing like playing voice, recording voice, DTMF detection etc. Upon allocation, the DSP resource is ready to receive the call and the ISDN signaling process informs the voice processing software at 514. Simultaneously, the ISDN signaling process sends a message to the PSTN switch, requesting that it establish a connection with the analogue phone via a connect ISDN message (arrow 515) and the switch then makes this connection 518. Finally, the switch sends acknowledgment of this back to the ISDN signaling process (arrow 520) with a connect acknowledge message, which can be forwarded to the application to indicate that the call is connected 524.

Figure 3A:
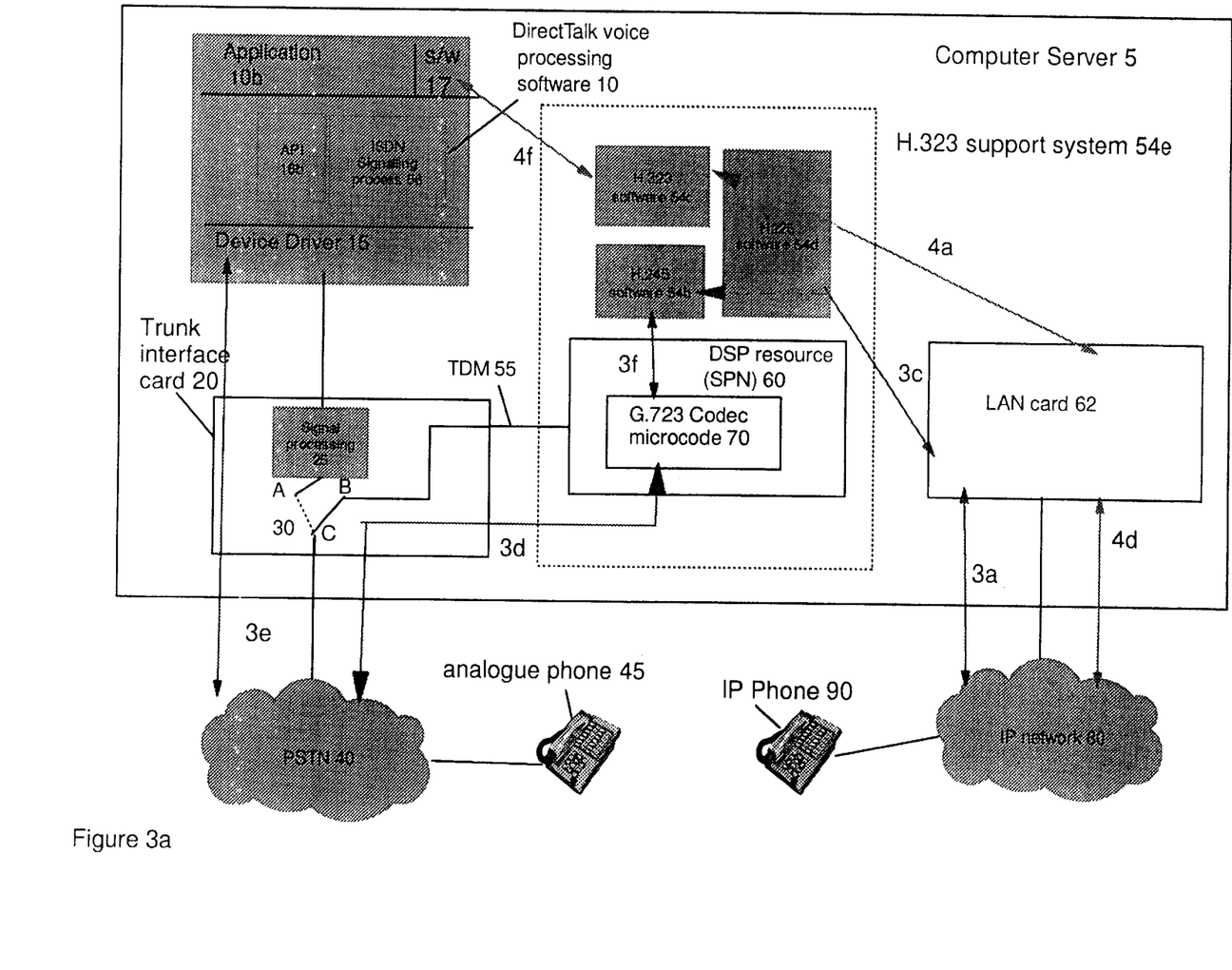
FIG. 3a illustrates communication between an IP phone and a standard telephone attached to the PSTN using a voice processing system as a gateway. It also depicts communication between an IP phone and a voice response application.

It is also desirable for an IP phone to be able to communicate with an analogue phone 45 attached to the PSTN 40. One possible way of achieving this is to use the DirectTalk voice processing system as a gateway device, as shown in FIG. 3*a*.

A Local Area Network (LAN) card 62 is plugged into the PCI bus (not shown) and interfaces to an IP network 80 (eg the Internet). A DSP resource card 60, in the preferred embodiment an Arctic 960RxD card (SPN) 60 made by Radisys and available from the IBM Corporation, is also plugged into the PCI bus and is attached to the TIC 20 (the DTXA in the present case) via the TDM bus 55. (Note that it would also be possible for the functionality of the LAN card 62 and the DSP card 60 to be combined into a single card).

As previously discussed, the H.323 standard provides a foundation for audio, video, and data communications across IP-based networks. With reference to the diagram, the dotted rectangle 54e defines the components that fall within the scope of this recommendation, and can be considered together as an H.323 support system (SS). Within the H.323 SS, the H.323 software is responsible for routing the telephony signals, whilst H.245 software caters for the physical transmission of the voice data. H.225 software deals with call control management. All three run on the AIX operating system. The SPN card 60 also operates in conformity with this standard.

The IP phone initiates the call, transmitting H.323 protocol data packets to the LAN card (arrow 3a) and this then sends the data to H.245 software (arrow 3c) 54b via the H.225 software 54d. The H.245 software then routes the data to the SPN card 60 (arrow 3f), where the G.723 codec microcode 70 decodes the data packets. These data packets are then transferred into the appropriate format for the particular TDM bus in the voice processing system (H.100 in the preferred embodiment, but MVIP, SCSA and any other suitable format could also be used). From here, the data reaches the DTXA and travels via the software switch 30 connection B to C to the PSTN 40 and ultimately to the phone 45 (see arrow 3d). The exact reverse is also possible.

In order to support this gateway operation, signaling comes in from the IP network via the LAN card (arrow 4d) and is routed to the H.323 software 54c (arrow 4a) via the H.225 software 54d. The H.323 software then interacts with a special custom application 17 (a custom server in Direct-Talk terminology) (arrow 4f). As a consequence of this the custom application 17 initiates an outbound call from the voice processing system (arrow 4g), which therefore interacts as appropriate with the ISDN signaling process 56 to set up this outbound call, and allocate it to the same TDM timeslot as the IP telephony call.

Figure 3B:
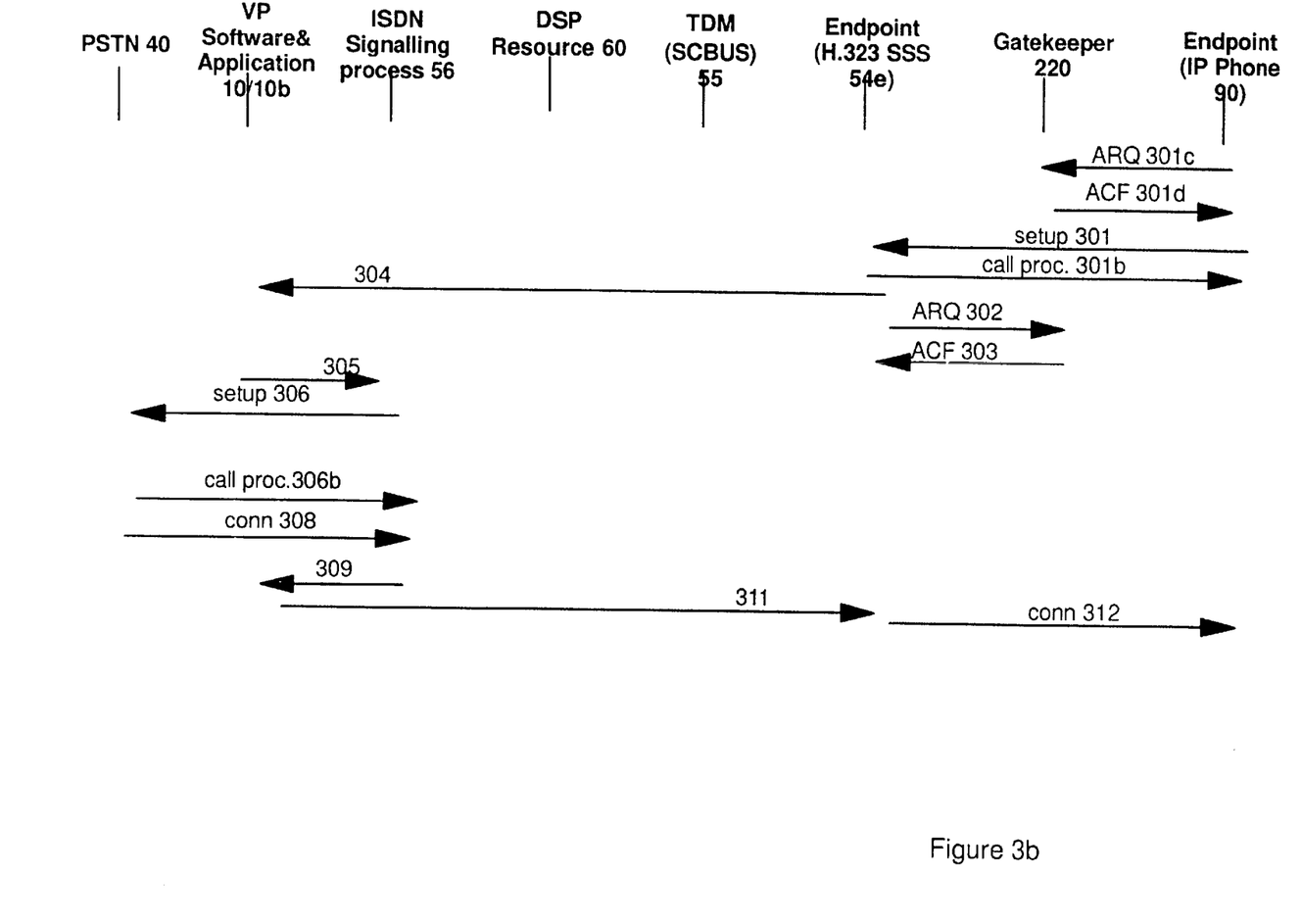

FIG. 3b illustrates the processing of an inbound IP call by the voice processing system gateway. An IP phone 90 makes a telephone call over the IP network (not shown). The IP phone queries the gatekeeper 220 via an ARQ message 301c, in order to verify that its endpoint destination exists. If all is well, the gatekeeper confirms this via an ACF message 301d. It is possible to make IP calls without the use of gatekeepers; it will be appreciated that the use or otherwise of gatekeepers for IP calls has no direct bearing on the present invention. The IP phone then initiates the call with a setup request 301 which, amongst other things, asks which telephony channel the call is being allocated to. This initial request, along with the rest of the IP phones's signaling, goes through the gateKeeper 220 which will route the call to voice processing system, or more specifically to the H.323 Support System 54e (SS) within that system, over the IP network. The H.323 SS then signals back to IP phone that its call is proceeding 301b and informs the IP phone of the number of the allocated telephony channel. The H.323 SS informs at 304 the voice processing software 10 and application 10b (or more specifically, the custom server application 17 of FIG. 3a) that there is an incoming call 304 The H.323 SS then queries the Gatekeeper via an ARQ message 302, in order to verify that it has the correct address for the IP phone, and receives confirmation of this via an ACF message 303.

The custom server 17 now initiates an outbound call over the PSTN from the voice processing software by issuing an application call (305) to the ISDN signaling process 56 to inform it that it should make a call to the PSTN. The ISDN signaling process therefore requests a connection with the PSTN 40 via a setup signal 306, and is then informed by the PSTN that the call is proceeding 306b.

A connection 308 is established and the ISDN signaling process 56 informs the voice processing software of the telephony channel upon which the call is placed. This allows a response 311 to be sent from the voice processing software back to the H.323 SS, which in turn forwards a connection signal 312 back to the originating IP phone. The H.323 SS can now connect the incoming voice data stream from the IP phone to the TDM bus, once it has requested the DSP resource to start running 314. In other words, the TDM timeslot on which the IP call is received is attached to the trunk/channel on which the outbound call over the PSTN is being made using the B to C setting of switch 30, thereby allowing the voice processing system to act as a gateway device between the IP phone 90 and the analogue phone 45.

Note that the H.323 SS may wish to take certain steps to ensure a smooth interface between the IP call and the PSTN call. For example, it may delay completing this connection a small period of time until it has enough buffered voice to play to the TDM bus. Likewise, it may also ensure that the appropriate TDM channel idle code is present to avoid noise on the line when there is no voice to be played. This is because there will invariably be a delay between the incoming call telephony signaling and the voice data being received.

Although the voice processing system of FIG. 3a can act as described as a gateway, it cannot however accept a call directly from an IP phone via the data-packet network (ie where the voice processing system is acting as the endpoint of the IP call, rather than as an intermediary). Rather, it is necessary for any incoming IP call to first exit the data network via the voice processing system acting as a gateway device to the PSTN (using the B to C setting of switch 30), and then to return to the voice response system via the PSTN interface (using the A to C setting of switch 30). This is equivalent to the voice processing system dialing its own telephone number when initiating the outbound call to the PSTN (step 306, FIG. 3b). Although this approach will allow the voice processing system to effectively receive a call from an IP telephone, the dog-leg into the PSTN and back is clearly unattractive. Firstly, it ties up additional ports on the PSTN interface, secondly it can lead to extra call handling charges, and thirdly it increases overall complexity, leading to possible delays, and so forth.

Figure 4A:
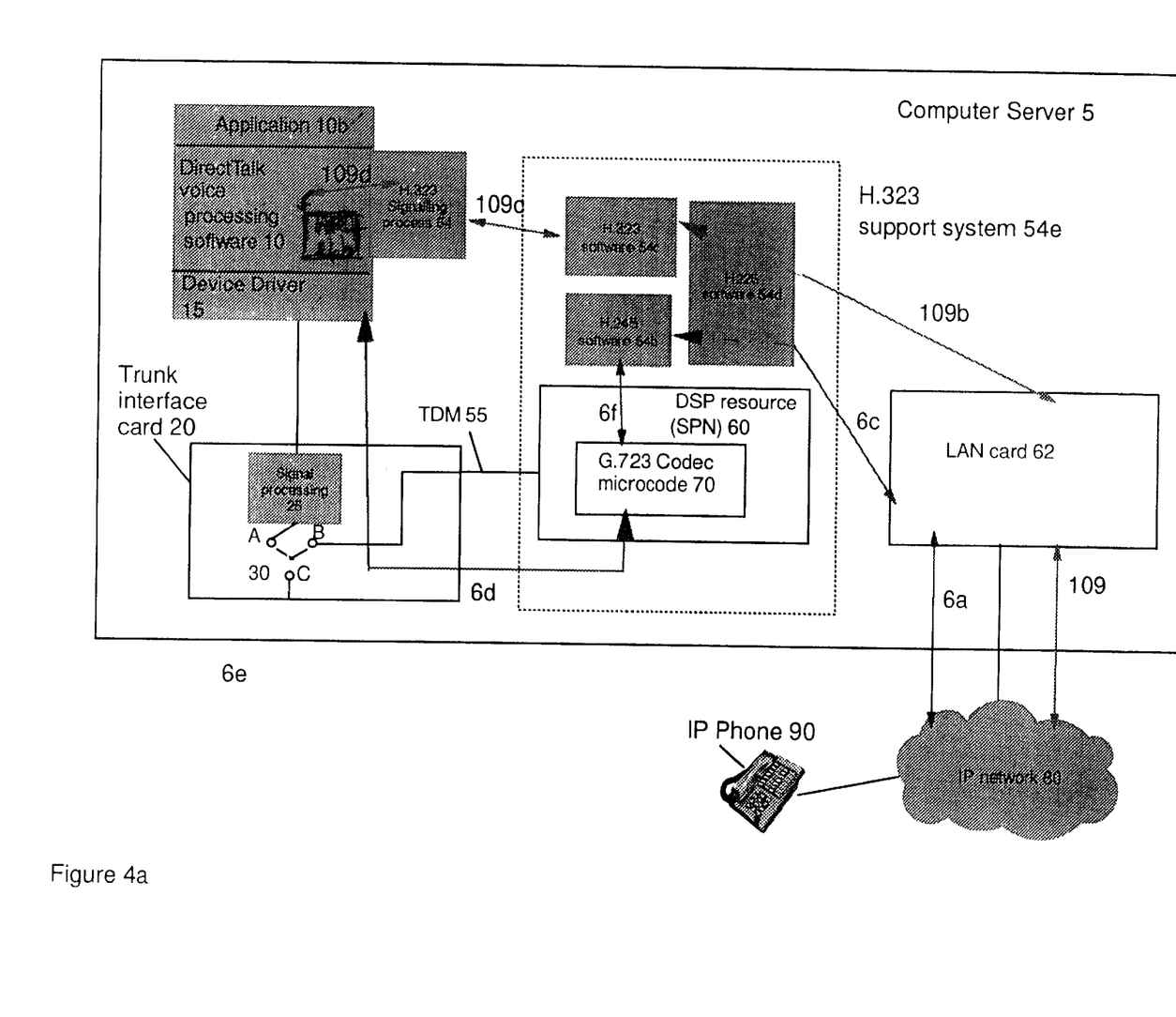
FIG. 4a depicts the communication between an IP phone and the voice response system's voice processing software, according to a preferred embodiment of the present invention.

FIG. 4a depicts the communication between an IP phone 90, the DirectTalk voice processing software 10 and finally the application itself 10b, according to a preferred embodiment of the present invention. The IP phone initiates the call, transmitting H.323 protocol data packets to the LAN card 62 (arrow 6a). This then routes the data through its device driver (not shown) to the H.245 software 54b (arrow 6c), via the H.225 software 54d. The H.245 software then transmits the data to the SPN card 60 (arrow 6f), where G.723 codec microcode 70 decodes the data packets, converts them to TDM data and transfers them to the TDM bus 55.

It will be appreciated that up until here, the processing of the inbound IP call is the same as in FIG. 3A. However, once the data reaches the trunk interface card 20 (the DTXA), and more particularly the software switch 30, the data path differs. Thus now data is sent directly, via a B to A software switch connection, to the voice processing software 10 (see arrow 6d), or more particularly to DSP signal processing 25 or device driver 15, which can properly process the audio data. At the same time as the above, a reverse channel is also set up, in which the voice data is passed over the TDM bus onto the SPN card, where it is encoded by the G.723 Codec 70 for transmission across the IP network 80. The above mode of operation is performed by providing a suitable H.323 signaling process 54, which interacts with the signal processing API 16*b* of the voice processing software. Note that the H.323 signaling process can be a standalone process, or can be incorporated into the H.323 SS 54*e* (although it is not a formal part of providing H.323 communications support). Incoming communications are transferred from the IP network 80 over the LAN card 62 (arrow 109), which then transmits the signaling component to the H.323 software 54*c* (arrow 109*b*) via the H.225 software 54*d*. The H.323 software 54*c* is responsible for routing these signals to the H.323 signaling process 54 (arrow 109*c*). At this point the H.323 signaling process interacts directly (arrow 109*d*) with the DirectTalk voice processing software through the signaling API, allowing incoming, outgoing and call clearing messages to be passed (arrow 109*d*). In addition, the H.323 signaling processes allocates the incoming IP channel an appropriate Trunk # and channel # (even though the trunk number has no meaning per se in terms of an IP call). It will be appreciated therefore that to the application 10*b*, this signaling appears exactly the same as if it were being received from the PSTN (since it is coming in through the same signaling API, and is allocated a trunk and channel number).

With respect to the audio (voice band) component of the IP call this is again handled largely as in FIG. 3*a*, except that the H.323 signaling process 54 is effective to drive the software switch 30 to its new setting (ie the B to A setting). This allows the voice processing system to directly process audio received over the TDM bus in the same way as audio data received at the TIC 20 from the PSTN.

One complication is that certain items, such as DTMF tones, are typically sent under H.323 as signals, whereas in the PSTN they are transmitted in the audio band (as tones). (The reason for this is that it is clearly much more effective in a packet network to transmit things as digital signaling rather than voiceband). One solution here is for the H.323 SS to convert these incoming IP signals representing DTMF keys into audio data, which are then injected with the rest of the audio data onto the TDM bus.

In the preferred embodiment however, for conventional PSTN calls, the signal processing resource 25 recognizes DTMF in incoming audio, and then signals the device driver, which in turn signals the application (via the voice processing system). The same signaling from the device driver to the application is triggered in the preferred embodiment by direct contact between the H.323 signaling process and the device driver (in other words, the H.323 signaling process informs the device driver that a particular DTMF key has been received, and this device driver then passes this information to the application, in exactly the same way as if the device driver had received the information first from the signal processing resource 25. The net result of course is again that from the perspective of the application, the IP call, in terms of voice, signaling, and any DTMF keys, appears exactly as if it had been received over the PSTN.

Although the voice processing system of FIG. 4*a* is shown as having connectivity to only an IP network 80, it will be appreciated that by rendering the origin of a call transparent to the application, it is in fact possible to use the same application for a conventional PSTN voice processing system (FIG. 2*a*), or for a hybrid system wherein part of the voice processing system handles IP calls, whilst the other part caters for PSTN calls, and where the application handles both sources of call transparently (this would clearly require the voice processing system to be connected to both the PSTN 40 and to an IP network 80, as shown in fact in FIG. 3*a*). Thus the voice processing system of the present invention is very flexible in terms of its deployment.

There are certain additional complications which are addressed in the preferred embodiment of the present invention. Firstly, the TIC 20 permits a configuration, whereby certain incoming trunks are defined to originate from the PSTN 40, with others being defined to originate from the TDM bus 55. This makes it is possible to configure the DTXA (using additional software) to allocate some of its channels for receiving calls from the PSTN, whilst others are dedicated to IP only. Note that the IP dedicated channels should disable or ignore their interface to the PSTN and all signaling alarms indicating the status of the PSTN must also be ignored (these will effectively be spurious, given that there is no proper PSTN connection). Instead, these alarms may be replaced by indications from the H.323 SS as to the status of the data network; ie alarms denoting that there is no connection or that the connection is not synchronized. This leads onto a further potential difficulty, in that the operation of the TDM bus in a voice processing system is normally clocked by signals received over the PSTN. However, if the DTXA is not connected to the PSTN then such timing signals are not available. Therefore in a preferred embodiment, the DTXA includes a master clock which can be used to control timing with the voice processing system.

Figure 4B:
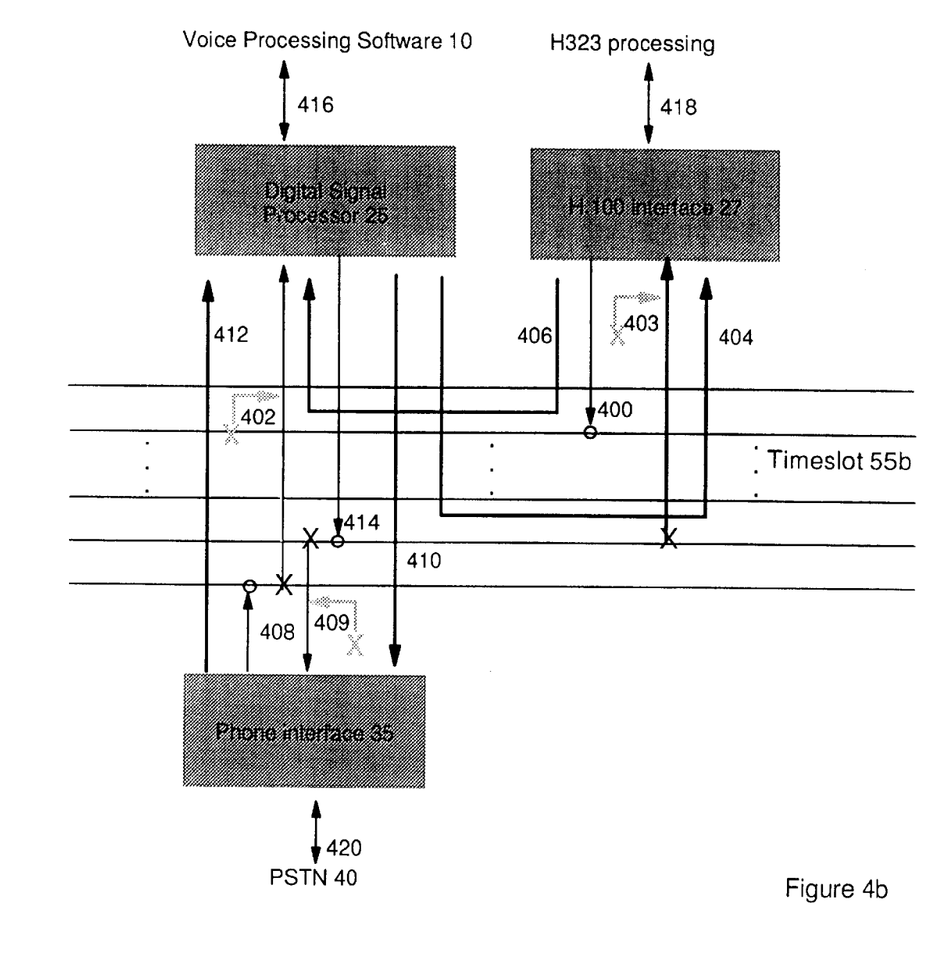
FIG. 4b shows in detail one aspect of the operation of the voice processing system of FIG. 4a according to a preferred embodiment of the present invention.

Referring now to FIG. 4*b*, this shows the operation of the software switch in more detail, according to a preferred embodiment of the present invention. Note, this figure should be read in conjunction with FIG. 4*a*. Those components referred to, but not illustrated, can be referenced in the other figure.

As previously described, voice data can flow in both directions from the voice processing software 10 to the digital signal processor 25 (arrow 416) and via a timeslot 55*b* on the TDM bus 55 to the voice processing system's interface 35 to the PSTN 40 (arrows 410, 412). This interface constitutes the point at which the TIC (DTXA) 20 is connected to the PSTN 40. From here it can then flow to and from the telephone network (arrow 420). (Note data is transferred as timeslots on the TDM bus.) It is the software switch setting A to C which enables the data to flow directly between the PSTN and the voice processing system. This switch setting is not however permanent, since the invention permits an IP phone to communicate directly with the voice processing software 10 running on the voice processing system. Arrows 404 and 406 show the flow of voice data between the digital signal processor 25 in the voice processing system and the H.100 interface 27 (in the preferred embodiment) to the SPN card 60 (the H.100 interface is not shown in FIG. 4*a* but logically lies below the G.723 codec). Once reaching this interface, the TDM data is converted to H.323 data-packets (arrow 418) for transmission across the IP network 80.

There is a permanent connection 408 between the phone interface 35 and the TDM bus for data flowing in the direction of arrow 412. However, the connection between the bus and the digital signal processor 25 is a temporary one (arrow 402). In other words, the connection may be added or broken 402 according to the signals received. For data being transmitted in the direction of arrow 410 the reverse is true. There exists a permanent connection 414 between the digital signal processors 25 and the TDM bus 55. However, a connection has to be added or removed 409 between the TDM bus 55 and the interface 35 to the PSTN 40.

Should the voice processing system wish to communicate directly with the IP phone, then rather than add the connection shown by arrow 409 a connection between the TDM bus and the H.100 interface 27 is added 403. For calls being made in the direction of arrow 406, the connection between the H.100 interface and the TDM bus 400 is permanent.

Thus an A to C setting corresponds to switches 402 and 409 on, and 403 off; a B to C setting corresponds to switches 403 and 409 on, and 402 off, whilst the new B to A setting corresponds to switches 402 and 403 on, and 409 off.

Figure 5:
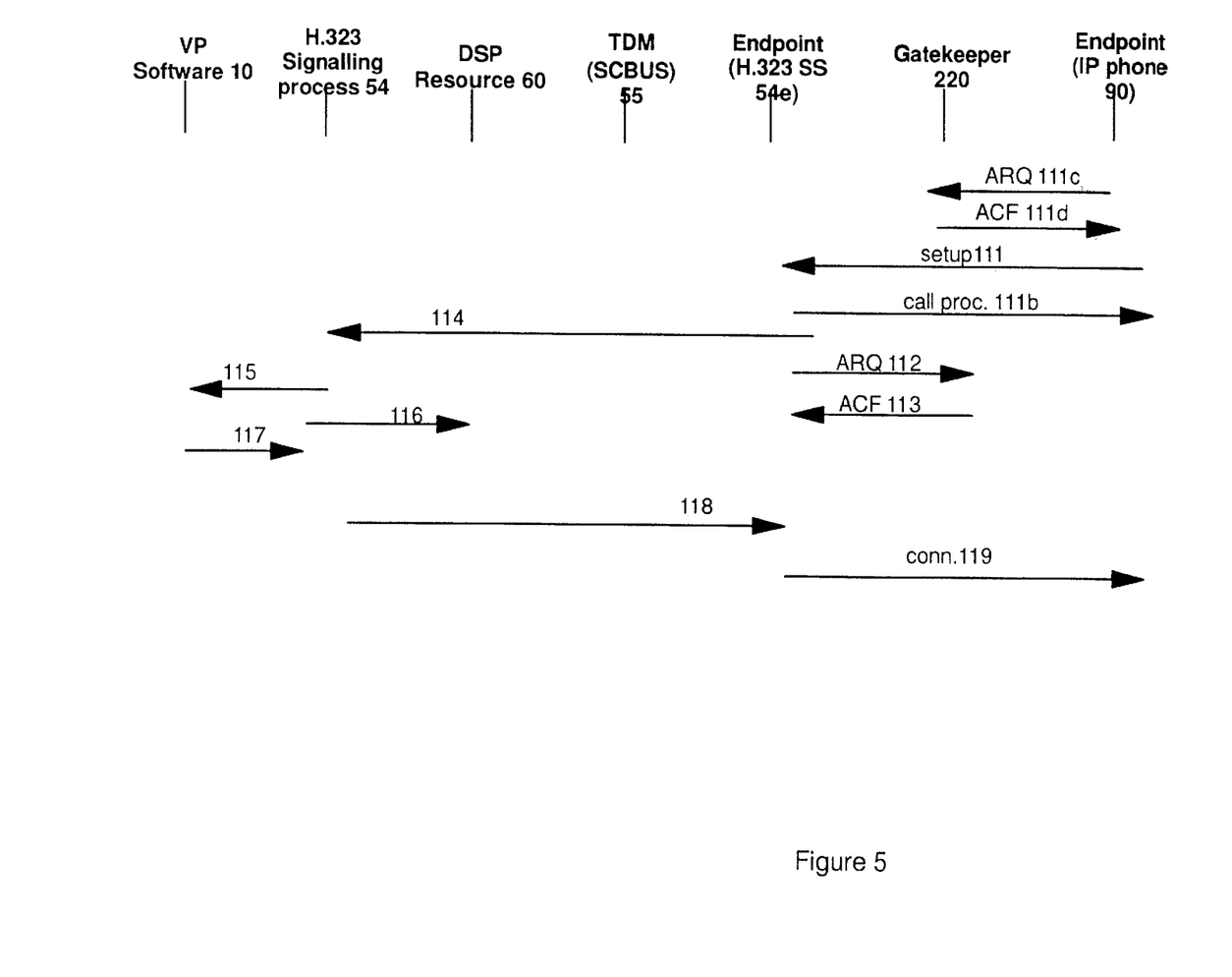
FIG. 5 illustrates the processing of an inbound IP call according to a preferred embodiment of the present invention.

FIG. 5 is a diagram illustrating the processing of an inbound call according to a preferred embodiment of the present invention. An IP phone 90 makes a telephone call over the IP network (not shown). According to the preferred embodiment, the IP phone queries the gatekeeper 220 via an ARQ message 111c, in order to verify that its endpoint destination (ie voice processing system) exists. If all is well, the gatekeeper confirms this via an ACF message 111d. The IP phone then initiates the call with a setup request 111 which, amongst other things, asks which telephony channel the call is being allocated to. This initial request, along with the rest of the IP phone's signaling, goes through the GateKeeper 220 which will route the call to the voice processing system, or more specifically the H.323 SS 54e within that system, over the IP network. The H.323 SS then signals back to IP phone that its call is proceeding 111b and informs the IP phone the number of the allocated telephony channel. If the H.323 SS 54e agrees that the call over IP has its destination there, it signals this back to the Gatekeeper via an ARQ message 112 and receives an ACF message 113 as confirmation. At the same time the voice processing system's H.323 signaling process 54 is informed that there is an incoming call 114.

The H.323 signaling process informs the voice processing software 10 which trunk and channel the incoming call is to take place on. It is the responsibility of the H.323 signaling process to map the incoming IP channel information onto an appropriate Trunk #, channel # as used by the voice processing systems for PSTN calls.

According to the preferred embodiment, the H.323 signaling process is therefore informed of all the Trunk # and channel #'s which it is permitted to use on the system. The DirectTalk product achieves this with a procedure where all trunks and channels which have been enabled have events are sent to the H.323 signaling process so it is aware of the current state of the voice processing system. In an alternative preferred embodiment, this is achieved by setting up a configuration file which is then read by the H.323 signaling process.

The H.323 signaling software (see 54c of FIG. 4a) informs the voice processing software 10 that there is an incoming call 115 via the H.323 signaling process 54 which allows incoming, outgoing and call clearing messages to be passed. The voice processing software will then launch an application and this can be done for example based on the incoming allocated channel or incoming information (eg called number or calling number) if this is also passed from the H.323 signaling process to the IVR application.

According to the preferred embodiment, before the voice processing software decides whether or not to accept the call, the H.323 signaling process allocates 116 a DSP resource 60. Upon allocation, the DSP resource is ready to receive the appropriate incoming voice data stream. According to the preferred embodiment, the voice processing software then sends an event to the H.323 signaling process to inform it that the call is being accepted 117.

The H.323 signaling process takes this information, and converts it into a response to inform the IP phone 90 via the H.323 SS (see 54e of FIG. 4a) that the call has been accepted 118, 119. Once confirmation has been achieved at the IP phone that the call is connected, then the incoming voice data stream from the IP phone is transmitted over the IP network to the TDM bus via the DSP resource. The H.323 SS may wish to delay this a small period of time until it has enough buffered voice to play through the voice streamer to the TDM bus.

Note that signal processing resource 25 on the DTXA does not need to run until AFTER the call has been set-up. (In many voice processing systems which have CAS or analogue connection to telephone lines, such DSP resources are involved in incoming and outgoing call setup procedures in order to enable DTMF pulse detection or call progress analysis. However, according to the preferred embodiment, the DSP resource does not need to be used during this period because the IP connection simulates the use of Common Channel Signaling (CCS)).

Figure 6:
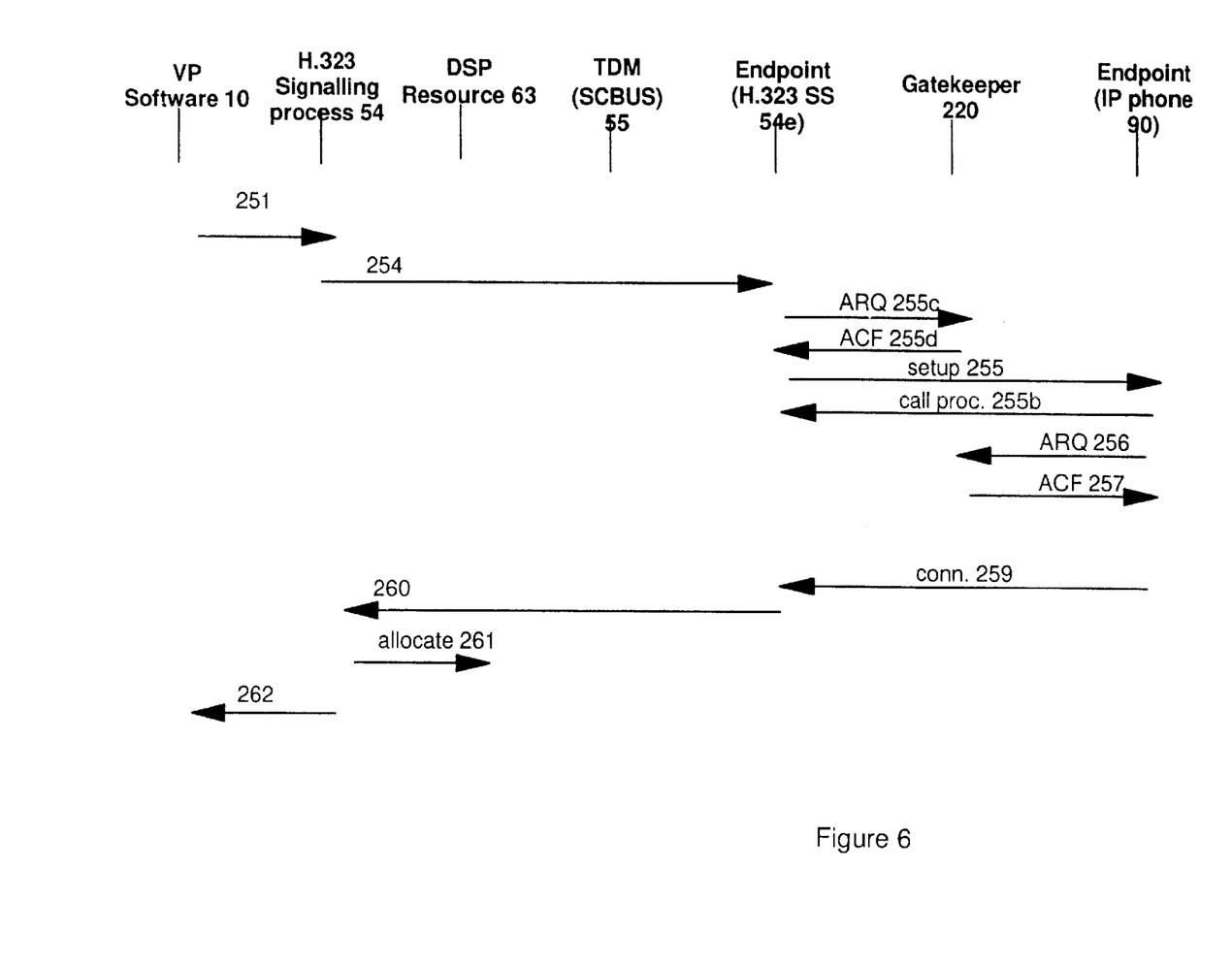
FIG. 6 illustrates the processing of an outbound IP call according to a preferred embodiment of the present invention.

Referring now to FIG. 6, conventionally, most IVR products support outgoing calls as well as inbound calls. FIG. 6 illustrates the sequence of events according to a preferred embodiment of the present invention. Voice processing software 10 running on the voice processing system (under control of an application) wishes to initiate a call to an IP phone 90. The voice processing software may specify to the H.323 signaling process 54 which Trunk # and channel # the system wishes to use. Alternatively, in the preferred embodiment, this decision is the responsibility of the H.323 signaling process itself and the H.323 signaling process is informed of all the Trunk #'s and channel #'s which it is permitted to use on the voice processing system 251.

To support this, in the preferred embodiment, the DirectTalk product has a procedure where all trunks and channels which have been enabled have events sent to the H.323 signaling process so it is aware as to current state of the IVR system. An alternative approach is to set up a configuration file which can be read by the H.323 signaling process. (Note that the H.323 SS makes this selection from those trunks/channels which have been allocated to IP telephony in the system configuration; in this way it is possible to distinguish IP outbound calls from any PSTN outbound calls which the system desires to make. This 10 distinction can also be performed by the voice processing software based on the format of the outbound number to be dialed).

According to the preferred embodiment, the H.323 signaling process accepts the trunk # and channel # from the voice processing software or alternatively generates one from its list of valid ones and currently non-active ones. The H.323 signaling process then sends the outbound call to the H.323 SS 54e within the voice processing system (arrow 254), which places the desired call via the Gatekeeper to the IP phone 90 (each Gatekeeper is responsible for routing the call to either another Gatekeeper or to the IP phone, with the call terminating on the destination endpoint IP address). According to the preferred embodiment, the H.323 SS queries the Gatekeeper. 220 via an ARQ message 255c, in order to verify that its endpoint destination (ie the IP phone 90) exists. If all is well, the Gatekeeper confirms this via an ACF message 255d. (Note, according to the H.323 standard, in some configurations the Gatekeeper negotiation may not be required.) The H.323 SS then initiates the call with a setup request 255 which, amongst other things, asks which telephony channel the call is being allocated to. The IP phone then signals back to the H.323 SS that the call is proceeding 255b and informs the H.323 SS of the number of the allocated telephony channel. The IP phone then queries the gatekeeper 220 in order to verify that it has the correct address for the H.323 SS (arrow 256) and receives confirmation of this (arrow 257).

The IP phone then signals back to the H.323 SS that it is accepting the call 259, and the H.323 SS informs the H.323 signaling process of this 260. The H.323 signaling process then allocates a DSP resource 240 on the channel which the call is on 261, and notifies the voice processing software of the arrival of the call 262.

Note that the H.323 signaling process may wish to wait for the first group of data packets to be buffered before informing the voice processing system that the call has been accepted and voice can be sent on the channel to the voice streamer. However, a person skilled in the art will realize that this does not have to be so and that the H.323 signaling process may transmit the data immediately.

The invention has been described in the context of telephone calls transmitted entirely over the Internet. It is however, important to note that the invention is not limited to such. An Internet Protocol (IP) call is not restricted to the Internet, but may be made over any network capable of supporting IP (eg an intranet or extranet).

What is claimed is:

1. A voice processing system comprising:
    a first interface for receiving telephone calls from the Public Switched Telephone Network (PSTN);
    application software for processing received PSTN telephone calls;
    a second interface for receiving telephone calls from an internet protocol (IP) network; and
    a signaling subsystem for routing an IP call from the second interface to the application software, such that it is transparent to the application software that said call has been received from the IP network rather than the PSTN, wherein the system further comprises
    means for allocating a trunk number to a IP call, thereby making the IP call compatible with the input requirements of the application software,
    means for routing audio data elements of the IP call to the first interface and thence directly to the application software; and
    means for routing signaling elements of said IP call to the signaling subsystem.

2. The voice processing system of claim 1, wherein said first and second interfaces are both connected to a TDM bus.

3. The voice processing system of claim 2, wherein said first interface provides multiple voice processing channels and at least one voice processing system channel is dedicated to receiving IP calls over the TDM bus.

4. The voice processing system of claim 3, wherein the first interface further comprises a master clock for providing timing control on the TDM bus.

5. The voice processing system of claim 2, wherein said second interface comprises means for converting the IP audio data received from the IP network into TDM format for transmission across the TDM bus.

6. The voice processing system of claim 2, wherein the second interface includes means for converting certain signalling elements of said IP call into audio data for transmission to the first interface over the TDM bus.

7. The voice processing system of claim 6, wherein said certain signalling elements comprise DTMF tones.

8. The voice processing system of claim 2, wherein there is a device driver associated with the first interface and said device driver comprises:
    means for detecting DTMF tones in audio input received from the PSTN;
    means for informing the application software that a particular DTMF tone has been received,
    and wherein the second interface includes means, responsive to a DTMF tone signalling element in said IP call, for causing the device driver to inform the application that the corresponding DTMF tone has been received.

9. The voice processing system of claim 1, wherein the signalling subsystem comprises one or more signalling processes.

10. The voice processing system of claim 9, wherein said one or more signalling processes all communicate with the application software via the same signalling interface.

11. The voice processing system of claim 10, wherein said one or more signalling processes include an H.323 signalling process for processing IP calls received at the second interface.

12. The voice processing system of claim 11, wherein said H.323 signalling process includes means for mapping the channel upon which the IP call is placed into a corresponding voice processing system trunk and channel.

13. The voice processing system of claim 10, wherein said H.323 signalling process uses the signalling interface to alert the application to network error conditions.

14. The voice processing system of claim 9, wherein said one or more signalling processes further include an ISDN signalling process for processing received PSTN calls.

15. The voice processing system of claim 9, wherein said one or more signalling processes further include a SS7 signalling process for processing received PSTN calls.

16. The voice processing system of claim 9, wherein said one or more signalling processes further include a CAS signalling process for processing received PSTN calls.

17. The voice processing system of claim 1, wherein said IP network is the Internet.

18. The voice processing system of claim 1, wherein the second interface supports H.323 protocol software.

19. The voice processing system of claim 1, wherein the first interface is a telephony trunk interface card.

20. A method for operating a voice processing system including a first interface for receiving telephone calls from the Public Switched Telephone Network (PSTN) and application software for processing received PSTN telephone calls; said method comprising the steps of:
    receiving at a second interface an IP telephone call from an internet protocol (IP) network; and
    routing the IP call from the second interface to the application software, such that it is transparent to the application software that said call has been received from the IP network rather than the PSTN, wherein the system further comprises
    allocating a trunk number to a IP call, thereby making the IP call compatible with the input requirements of the application software,
    routing audio data elements of the IP call to the first interface and thence directly to the application software; and
    routing signaling elements of said IP call to the signaling subsystem.

* * * * *